Nov. 19, 1946.  G. E. KING  2,411,378

CONTROL SYSTEM

Filed Dec. 5, 1944

WITNESSES:
Edward Michaels
Leon J. Taza

INVENTOR
George E. King.
BY
Paul E. Friedeman
ATTORNEY

Patented Nov. 19, 1946

2,411,378

UNITED STATES PATENT OFFICE 2,411,378

CONTROL SYSTEM

George E. King, Swissvale, Pa., assignor to Westinghouse Electric Corporation, East Pittsburgh, Pa., a corporation of Pennsylvania Application December 5, 1944, Serial No. 566,724

6 Claims. (Cl. 172—239)

My invention relates to electrical control systems for electric motors and, more particularly to electric systems of control for direct current motors.

Modern methods of manufacture require that electric motors operate over greater and greater speed ranges. In an effort to meet these requirements inventors have not been idle. To this end improvements on the well known and standard Ward-Leonard control have been attempted. For instance a control for a self-excited generator has been provided. Another scheme is a Ward-Leonard control associated with a unique arrangement of a regulating generator. A still other system of control to obtain this greater speed range is a recently successful development of a series drive utilizing a series generator and a series motor.

The standard Ward-Leonard drive, the self-excited generator drive, and the series drive all have, however, some serious limitations depending on the use to which the drive is put. On the other hand the Ward-Leonard drive utilizing the regulating generator is, for many applications, prohibitive in price.

One broad object of my invention is the provision of a variable speed drive for a machine that shall be universal in its application and also be simple, efficient, and low in cost.

Another object of my invention is the provision of a variable speed drive that invariably provides the speed selected as indicated on the speed control means, as a rheostat, and does so over a wide speed range.

A still further object of my invention is the provision of a simple direct current variable speed drive for obtaining any one constant speed over a speed range as high as one hundred to one.

Other objects and advantages of my invention will become more apparent from a study of the following specification and the drawing, in which.

Figure 1:
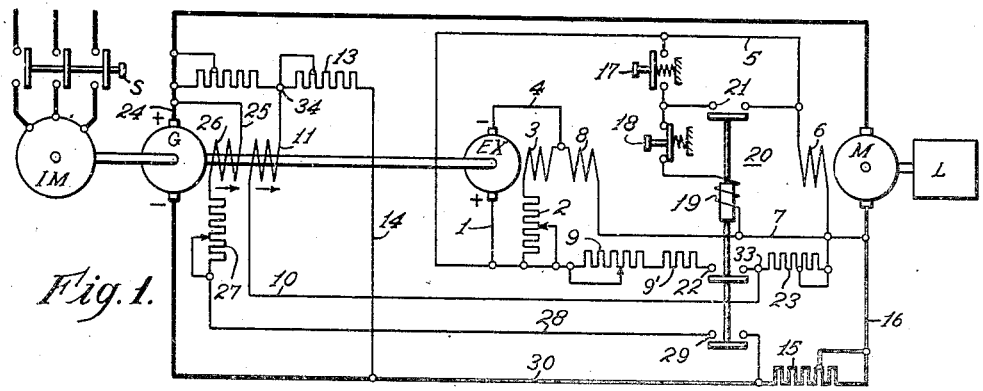
Figure 1 is a diagrammatic showing of my invention as applied to a non-reversing application.

As above generally outlined the variable speed drives at present on the market have some limitations except those utilizing a regulator generator of the type disclosed in my prior Patents No. 2,205,204, issued June 18, 1940, entitled "Variable voltage motor control," and No. 2,221,584, issued November 12, 1940, entitled "Control system." However, wherever a regulating generator is to be utilized and the load to be driven is relatively small, the regulating generator and the motor for driving it may become as big and as expensive as the main driving motor and generator therefor. It is thus clear, equipment of this nature would be nearly twice as expensive as a drive where no regulating generator was necessary. I provide a unique circuit and use of the regulating generator directly as a power generator for the main driving motor and do this without the loss of any of the regulating and amplifying effect of the generator. For instance, in Fig. 1 IM represents a constant speed induction motor for driving an exciter EX and a generator G. It is to the control of this generator G that my invention is particularly directed. The motor M drives a suitable load L, the speed of which is to be varied.

To better understand the details of the operation of my system of control a discussion of a definite sequence of starting and operation may not be amiss.

Before the load L is to be operated switch S is, of course, closed and motor IM is operated at full constant speed to drive the generator G and the exciter EX. Since the exciter is of the self excited type a circuit will be established from the positive terminal of the exciter through conductor 1, rheostat 2, field windings 3 and conductor 4 to the negative terminal of the exciter. Another circuit is established from the energized conductor 1 through conductor 5, field windings 6 of the motor M, conductor 7 and stabilizing series field windings 8 of the exciter to the negatively energized conductor 4.

To start the load L, the attendant operates switch 17 whereupon a circuit is established from the positively energized conductor 5 through the push button switch 17, a stop switch 18, coil 19 of the starting line contactor 20 to the negatively energized conductor 7. This contactor closes its holding contacts 21 thereby shunting the starting switch 17 and the contactor is maintained in its operated position.

Operation of contactor 20 establishes a circuit from the positively energized conductor 1 through rheostat 9, permanent resistor 9', contact members 22, adjustable resistor 23 to the negatively energized conductor 7. The purpose of this circuit will appear hereinafter. Another circuit is established from positively energized conductor 1 through the speed adjusting rheostat 9, permanent resistor 9', contacts 22 of switch 20, conductor 10, pilot field windings 11 of the generator G, adjustable resistor 13, conductors 14 and 30, adjustable resistor 15 and conductor 16 to the negative energized conductor 7.

There are still other circuit paths that may be traced for the field windings 11 from junction 34 to the negatively energized conductor 7. However, it is not important at this stage to trace these circuits but it is important to note that at the initial stage the field windings 11 becomes energized and the generator G builds up its voltage to a predetermined value determined by the adjustment of rheostat 9 and the particular number of resistor sections of resistor 13 in circuit with the field windings 11.

Figure 3:
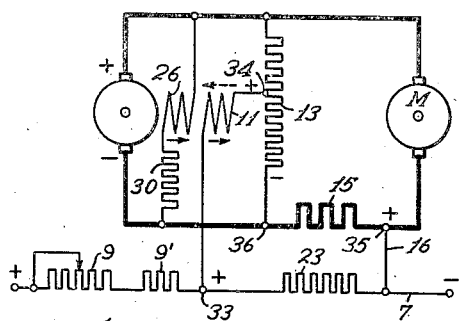
Fig. 3 is a simplified schematic showing of my invention to aid in the disclosure of my invention.
Figure 4:
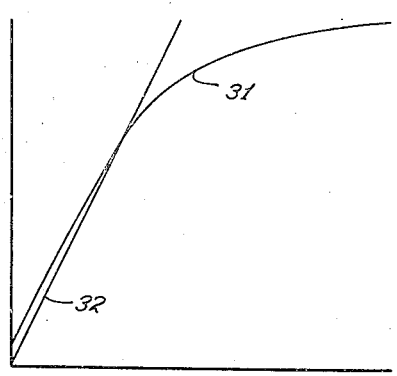
Fig. 4 shows some curves illustrating some of the theory embodied in my invention.

A circuit is also established from the positive terminal of the generator G through conductors 24 and 25, field windings 26, rheostat 27, conductor 28, contact members 29, conductor 30, to the negative terminal of the generator. The field windings 26 are thus energized to produce a flux for the generator which is in the same direction as the flux produced by the field windings 11 at the starting of the exciter EX. This self energizing field winding 26 of the generator G has its rheostat 27 so adjusted that its field characteristic line coincides with the air-gap line of the no-load saturation curve. This is shown in Fig. 4 where the curve 31 represents the no-load saturation curve of the generator G and the curve 32 represents the resistance line of the field circuit for the field 26. With this type of adjustment for the rheostat 27 there is no tendency for the generator G to build up a voltage without the aid of the pilot field 11. Also if a voltage has been built up by the pilot field 11, as is the case for the sequence of operation just described, the self energized field winding 26 will tend to maintain its voltage. This is even true if the circuit for the pilot field 11 should be opened. This, however, is only true under the operating conditions existing at the time the adjustments of the circuit are made. Any change in the load current of the motor M, or a change in the total resistance of the field circuit of the self energizing field winding 23 due to a rise in temperature or for some other reason, or any change in the brush resistance or any other factors affecting the operating conditions will cause the voltage of the generator G to change. In the absence of the pilot field winding 11, the generator G is thus adjusted for an unstable voltage characteristic. To prevent any instability and to maintain the voltage selected for the generator G by the rheostat 9, the pilot field winding 11 maintains the voltage constant. This will be apparent from a study of Fig. 3. At the starting, as already pointed out, the voltage of the exciter, that is the voltage from conductor 1 to conductor 7, is impressed across the resistors 9, 9' and 23 and from a junction 33, which is positive of a selected value with reference to conductor 7, a voltage is impressed across the pilot field winding 11 through junction 34, resistors 13 and 15 and conductor 16 to the conductor 7. It will thus be apparent that the value of the excitation of the pilot field winding 11 is determined by the relation of the voltage drop across resistor 13 as compared to the voltage drop across resistors 15 and 23.

For normal operation at a given load and a selected speed, the junction 34 is positioned at such a point along resistor 13 that no current at all flows through the pilot field. The generator G therefore maintains its own voltage by its self excited field winding 26 and zero current flows through the field winding 11. There is thus no waste of energy and as long as all conditions of operation are stable the generator voltage is self maintained and the motor speed remains constant. Assuming that the motor load rises, the current, therefore, in the loop circuit of the generator and motor including the resistor 15 rises and therefore the potential drop across resistor 15 from junction 35 to junction 36 rises. The total drop, therefore, across resistors 15 and 23 rises and junction 33 becomes more positive with reference to junction 34 and a current flows through the pilot field winding 11 to produce a field in the direction indicated by the full line arrow, namely, a current that is additive in its excitation effect on the generator G and in consequence the voltage of generator G rises. Since the change in the total drop across resistors 15 and 23 is determined by the load current of the motor, it is proportional to the potential drop of the motor and in consequence the excitation of the generator G is increased just in the right proportion to take into consideration the tendency of the motor M to decrease in speed. The speed of the motor M is thus maintained constant.

On the other hand, if the load on the motor decreases the current in the loop circuit decreases and in consequence the potential drop across the resistor 15 decreases and in consequence junction 34 becomes more positive than junction 33 and a current flows through the pilot field winding 11 in the direction to produce a field indicated by the dotted line arrow which is now differential with reference to the self excited field 26 and the generator voltage is decreased directly in proportion to the tendency of the motor M to speed up by reason of the decrease in load.

It is thus apparent that I have provided a generator for supplying power to a motor which in itself is regulating and amplifying in effect and has the added advantage that the regulator field winding carries only sufficient energy to effect the regulation and amplification desired. There are thus a number of advantages for the type of application I disclose herein over the controls I have shown in my above-mentioned prior patents. The number of pilot fields is limited to a single field winding which is only energized when energization is needed and further the self-excited field winding has its circuit so tuned that it assumes the entire excitation load for all stable operations and aid to the self excited field winding is only then called into effect when needed, the pilot field winding 11 giving the aid.

Figure 2:
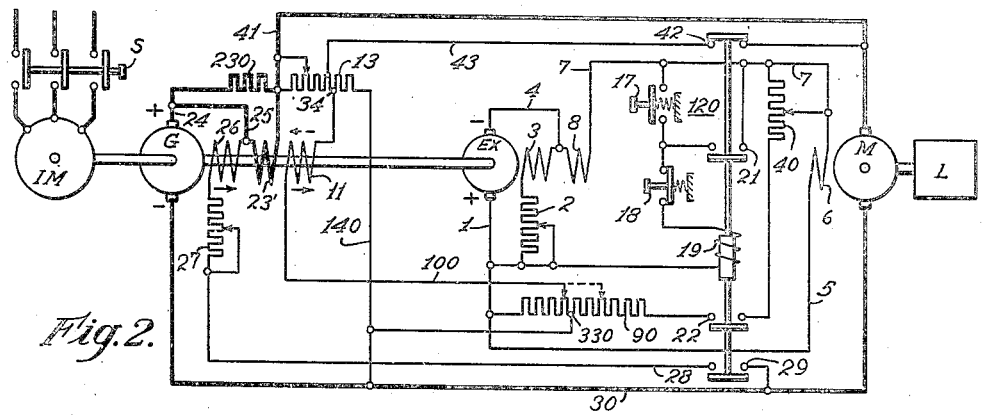
Fig. 2 is a diagrammatic showing of my invention modified to obtain motor reversing.

In the showing of Fig. 1 I have shown my control for its simplest non-reversing application. However, my invention is also well adapted for reversing operation as shown in Fig. 2. In this figure I have indicated all the elements which are like those shown in Fig. 1 with the same reference characters to facilitate the study of this control.

Again G is the generator for supplying the motor M and IM is the constant speed motor for driving the exciter EX. In this application I provide a main contactor 120 having four contact members instead of three as shown in Fig. 1 to effect the necessary circuit to be described. In lieu of the rheostat 9 I provide rheostat 90 which is of the reversing type and for the showing made when the exciter is fully energized, a circuit is established from a negatively energized conductor 1 through any selected portion of the resistor sections of rheostat 90 through conductor 100, pilot field winding 11, a selected portion of resistor 13 and conductor 140 back to a junction 330 on the rheostat 90. It will thus be apparent that for the adjustment shown here the movable element of the rheostat 90 is opposite the junction 330 no voltage whatsoever will be impressed across the pilot field winding 11. This, therefore, is the zero speed setting for the motor M. Any other speed in either direction may be selected by merely shifting the conductor 100 either toward the right or toward the left. For the position shown in full line for conductor 100 it is equivalent to place it on the junction 33 of Fig. 3 on conductor 7, or for that matter on junction 36. Now, if the generator G is operated, the pilot field winding is merely connected across a section of the resistor 13, but, since the self exciting field winding has its resistance adjusted to coincide with the air gap line of the no-load saturation line, the generator G cannot build up voltage when motor M is at zero speed.

To better understand the merits of my invention shown in Fig. 2 a detailed study of a sequence of operation may also be of value assuming that the induction motor IM is caused to operate and the exciter EX is excited in the manner discussed in connection with Fig. 1. Then it will be noted that before the line contactor 20 is operated, a circuit is established from the positive terminal of the generator G through conductor 24, shunting resistor 230 in parallel with the series field winding 23', conductor 41, contacts 42, conductor 43, pilot field winding 11, conductor 100, junction 330 to the negatively energized conductor 30. However, the direction in which pilot field winding 11 would thus seem to be energized is opposite to the residual magnetism of the generator G and as a consequence no voltage is built up.

If the apparatus is to be started the starting switch 17 is operated, operating the main contactor 120 thereby opening the circuit for the pilot field winding 11, at the contacts 42 and establishing an energizing circuit for the rheostat 90 from the negatively energized conductor 1 through the rheostat 90, contacts 22, adjustable resistor 40 to the negatively energized conductor 7. It will thus be seen that the pilot field winding 11 may be energized in one or the other direction by shifting the conductor 100. Since the contacts 29 are also closed, field winding 26 is energized through its rheostat 27 and the generator G builds up voltage depending in value on the position of the speed adjusting conductor 100 or resistor 40. The operation is now very similar to that discussed in connection with Figs. 1 and 3 but now the portion of the rheostat 9 to the right of the connection of the conductor 100 has its voltage drop balanced against the section of the resistor 13 to the right of junction 34. No resistor corresponding to resistor 23 is, however, necessary. The variation in excitation with variations in load is, however, now taken care of by voltage drop across resistor 230. With a voltage drop, because of an increase in load, energization of the series field winding 23' increases, that is, if the speed of the motor 10 tends to decrease, the effect of field winding 23' increases to increase the excitation of generator G. Again the excitation of the pilot field winding 11 is a minimum and the excitation required to compensate for any tendency to have the speed of motor M changed is effected by field winding 23'.

If it is intended to stop the equipment, stop switch 18 is operated and in consequence the circuit for rheostat 90 is opened at contacts 22, the exciting circuit for the field winding 26 is opened at contacts 28 and contacts 42 are closed energizing the field winding 11 in a direction to dissipate all residual flux of the generator G and thus make certain that no voltage is supplied to the motor M.

From the foregoing it will be apparent that I have provided a unique variable speed drive but I do not wish to be limited to the particular circuit arrangement shown and described but wish to be limited only by the scope of the claims hereto appended.

I claim as my invention:

1. In a speed control system for a direct current motor, in combination, a motor the speed of which is to be controlled, a field winding for the motor, a source of direct current potential connected to energize the field winding a selected amount, a generator suitably driven at a constant speed connected to supply energy to the motor armature, said generator having a self-excited field winding whose field circuit resistance is adjusted to substantially coincide with the air-gap line of the no-load saturation curve, whereby said generator will for any given stable operating condition maintain the voltage to which the generator is adjusted, circuit means interconnected with the connection between the motor and generator and said source of direct current potential and subject to changing voltage drops between selected points of said circuit means with changing operating conditions of the motor and a pilot field winding for the generator interconnected with said circuit means and responsive to departures of said voltage drops from a selected voltage drop of said circuit means to thus be energized to act cumulatively or differentially to the self excited field winding depending on the sign of the departure of said voltage drop.

2. In an electric system for controlling the speed of an electric motor, in combination, a direct current motor having armature windings and field windings, a source of direct current having a selected substantially constant potential, the field windings of said motor being connected to said source of direct current to thus be energized at a substantially constant value, a direct current generator operated at a substantially constant speed from any suitable means, said generator and motor having armature windings, a load-current carrying resistor, a loop circuit including the generator and motor armature windings and the load-current carrying resistor, a generator field winding connected in shunt relation to the generator armature, an adjustable resistor in series with the generator field winding, the resistance value of said generator field winding and the adjustment of the adjustable resistor being so selected that the generator operates substantially in co-incidence with the air-gap line of the no-load saturation curve, a potentiometer resistor connected across the loop circuit so as to be in parallel relation to the motor armature winding and the load-current carrying resistor, a current control resistor, and a pilot field winding for the generator, both said pilot field winding and current control resistor connected in series being connected in parallel relation to a selected portion of said potentiometer resistor and said load-current carrying resistor, whereby said pilot field winding is energized in response to the load current of the generator and the voltage of the generator to act cumulatively with respect to the first generator field winding on a rise of load current from a given value and act differentially with respect to the first generator field winding on a decrease of load current from said given value.

3. In an electric system for controlling the speed of an electric motor, in combination, a direct curent motor having armature windings and field windings, a source of direct current having a selected substantially constant potential, the field windings of said motor being connected to said source of direct current to thus be energized at a substantially constant value, a direct current generator operated at a substantially constant speed from any suitable means, said generator having armature windings connected in a loop circuit with the motor armature windings, a series resistor connected in series with the loop circuit, a resistor connected in parallel relation with the motor armature and said series resistor, a circuit connection from the negative terminal of the motor to the negative terminal of said source of direct current, a plurality of resistors connected across the terminals of said source of direct current, and a pilot generator field winding connected in a loop circuit including one of said plurality of resistors, said series resistor, and any selected portion of the resistor connected in parallel with the motor armature and series resistor.

4. In an electric system for controlling the speed of an electric motor, in combination, a direct current motor having armature windings and field windings, a source of direct current having a selected substantially constant potential, the field windings of said motor being connected to said source of direct current to thus be energized at a substantially constant value, a direct current generator operated at a substantially constant speed from any suitable means, said generator having armature windings connected in a loop circuit with the motor armature windings, a series resistor connected in series with the loop circuit, a resistor connected in parallel relation with the motor armature and said series resistor, a circuit connection from the negative terminal of the motor to the negative terminal of said source of direct current, an adjustable resistor, and a pair of resistors of selected resistance values connected in series across the source of direct current terminals, and a pilot generator field winding having one of its terminals connected between said pair of resistors and having its other terminal connected at any selected point on the resistor connected in parallel with the motor armature and series resistor.

5. In an electric system for controlling the speed of an electric motor, in combination, a direct current motor having armature windings and field windings, a source of direct current having a selected substantially constant potential, the field windings of said motor being connected to said source of direct current to thus be energized at a substantially constant value, a direct current generator operated at a substantially constant speed from any suitable means, said generator having armature windings connected in a loop circuit with the motor armature windings, a series resistor connected in series with the loop circuit, a resistor connected in parallel relation with the motor armature and said series resistor, a circuit connection from the negative terminal of the motor to the negative terminal of said source of direct current, an adjustable resistor having one of its terminals connected to the positive terminal of said source of direct current, a resistor of fixed resistance value having one of its terminals connected to the other terminal of said adjustable resistor, a second resistor having one of its terminals connected to the other terminal of said first resistor of fixed resistance value and having its other terminal connected to the negative terminal of said source of direct current, and a generator pilot field winding having one of its terminals connected to the connection between the resistors of fixed resistance value and having its other terminal connected to a selected point on the resistor connected in parallel with the motor armature and series resistor.

6. In an electric system for controlling the speed of an electric motor, in combination, a direct current motor having armature windings and field windings, a source of direct current having a selected substantially constant potential, the field windings of said motor being connected to said source of direct current to thus be energized at a substantially constant value, a direct current generator operated at a substantially constant speed from any suitable means, said generator having armature windings connected in a loop circuit with the motor armature windings, a generator field winding connected in shunt relation to the generator armature, and adjustable resistor in series with the generator field winding, the resistance value of said generator field winding and the adjustment of the adjustable resistor being so selected that the generator operates substantially in coincidence with the air-gap line of the no-load saturation curve, a pilot field winding for the generator so energized in response to the load current of the generator and the voltage of the generator to act cumulatively with respect to the first generator field winding on a rise of load current from a given value and act differentially with respect to the first generator field winding on a rise of load current from a given value and act differentially with respect to the first generator field winding on a decrease of load current from a given value, a self-excited field winding for the generator having its circuit resistance adjusted to substantially coincide with the air-gap line of the no-load saturation curve of the generator, and a pilot field winding for the generator energized in proportion to the algebraic sum of a function of the voltage of the source of direct current and a function of the voltage and load current of the generator.

GEORGE E. KING.